(12) United States Patent
Choi et al.

(10) Patent No.: US 9,129,753 B2
(45) Date of Patent: Sep. 8, 2015

(54) DIELECTRIC CERAMIC COMPOSITION AND MULTI-LAYER CERAMIC CAPACITOR COMPRISING THE SAME

(71) Applicant: Samsung Electro-Mechanics Co., Ltd., Suwon (KR)

(72) Inventors: Du Won Choi, Suwon (KR); Min Sung Song, Suwon (KR); Jae Sung Park, Anyang (KR); Sung Hyung Kang, Seoul (KR); Chang Hoon Kim, Yongin (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 147 days.

(21) Appl. No.: 14/049,745

(22) Filed: Oct. 9, 2013

(65) Prior Publication Data

US 2014/0293502 A1    Oct. 2, 2014

(30) Foreign Application Priority Data

Mar. 29, 2013  (KR) .................. 10-2013-0034707

(51) Int. Cl.
*H01G 4/30* (2006.01)
*C04B 35/465* (2006.01)
*H01G 4/12* (2006.01)
*H01G 4/06* (2006.01)

(52) U.S. Cl.
CPC ............... *H01G 4/30* (2013.01); *C04B 35/465* (2013.01); *H01G 4/1227* (2013.01); *H01G 4/06* (2013.01)

(58) Field of Classification Search
CPC ....... H01G 4/30; H01G 4/1227; H01G 4/012; H01G 4/232; H01G 4/12; H01G 4/005; H01G 4/008; H01G 4/1209; H01G 4/1245; H01G 4/129; H01G 4/1218; H01G 4/228; H01G 4/2325; H01G 4/0085; H01G 4/01; H01G 4/1236; H01G 4/1281; H01G 4/06; H01G 4/10; H01G 4/224; H01G 4/236; H01G 4/248; H01G 4/302; H01G 4/33
See application file for complete search history.

(56) References Cited

U.S. PATENT DOCUMENTS

| 4,460,936 | A  | * | 7/1984 | Yamada et al. | ............... 361/305 |
| 6,195,250 | B1 | * | 2/2001 | Matoba et al. | ............. 361/321.5 |
| 6,344,427 | B1 | * | 2/2002 | Komatsu et al. | ............. 501/138 |
| 6,544,916 | B1 | * | 4/2003 | Sato et al. | ..................... 501/137 |
| 2003/0125193 | A1 | * | 7/2003 | Kobayashi et al. | ........... 501/139 |
| 2010/0033895 | A1 | * | 2/2010 | Yao | ............................. 361/321.4 |
| 2012/0098386 | A1 |   | 4/2012 | Kounga Njiwa et al. | |

FOREIGN PATENT DOCUMENTS

| JP | 2011-11918     | 1/2011 |
| KR | 10-2008-0022578 | 3/2008 |

\* cited by examiner

*Primary Examiner* — Dion R Ferguson
(74) *Attorney, Agent, or Firm* — McDermott Will & Emery LLP

(57) ABSTRACT

A dielectric ceramic composition including a base material represented by $(Ba_{(1-x)}+RE_x)mTiO_{(3+x)}$ (here, $0.995 \leq m \leq 1.010$, $0.001 < x < 0.010$, and RE is at least one rare earth (RE) atom selected from a group consisting of Dy, Y, Ho, Sm, and Gd) or $Ba_m(Ti+RE_x)O_{(3-x)}$ (here, $0.995 \leq m \leq 1.010$, $0.001 < x < 0.010$, and RE is at least one RE atom selected from a group consisting of Dy, Y, Ho, Sm, and Gd) as a main component, and a multi-layer ceramic capacitor using the same. In the dielectric ceramic composition, high permittivity (dielectric constant of 1800 or more) and high temperature reliability may be secured by using a RE atom doped/solid-solubilized base material and adding oxides, which are sub-components.

12 Claims, No Drawings

DIELECTRIC CERAMIC COMPOSITION AND MULTI-LAYER CERAMIC CAPACITOR COMPRISING THE SAME

CROSS REFERENCE(S) TO RELATED APPLICATIONS

This application claims the benefit under 35 U.S.C. Section 119 of Korean Patent Application Serial No. 10-2013-0034707, entitled "Dielectric Ceramic Composition and Multi-layer Ceramic Capacitor Comprising the Same" filed on Mar. 29, 2013, which is hereby incorporated by reference in its entirety into this application.

BACKGROUND OF THE INVENTION

1. Technical Field

The present invention relates to a dielectric ceramic composition and a multi-layer ceramic capacitor comprising the same.

2. Description of the Related Art

Recently, as a size of display devices such as a liquid crystal display (LCD), a plasma display panel (PDP), or the like, has increased and a speed of a central processing unit (CPU) has increased, a heat generation problem has become severe. Therefore, market needs for an X5R or X7R type multi-layer ceramic capacitor capable of securing stable capacitance and reliability at a high temperature for stable operation of an integrated circuit (IC) has increased.

Further, in accordance with the general trends toward miniaturization, lightness, and multi-functionality of electronic products, a multi-layer ceramic capacitor (MLCC) chip product having a small size, high capacitance, and high pressure has continuously been demanded. Therefore, excellent withstand voltage and DC-bias characteristics in addition to thinness of a dielectric layer have been importantly considered in developing the X5R or X7R type multi-layer ceramic capacitor.

The thinness and high pressure increases an intensity of electric field applied to the dielectric layer to deteriorate the DC-bias and withstand voltage characteristics. Particularly, a fine structural defect due to the thinness may have a severe negative influence on the withstand voltage characteristics such as breakdown voltage (BVD), high temperature insulation resistance (IR), and the like.

In order to prevent the negative influence, base material powder should be essentially atomized. However, when a grain size of the base material is decreased, it is more difficult to implement capacitance temperature characteristics, and permittivity may be decreased. Therefore, it is difficult to develop a dielectric raw material.

In order to solve this problem, selection of a base material, development of an additive composition, a material process such as dispersion, or the like, an internal electrode, a control of a firing process should be comprehensively and multilaterally studied. Particularly, it is very important to select a ceramic composition playing a conclusive role in physical properties of a raw material.

The existing high capacitance dielectric ceramic composition satisfying X5R or X7R characteristics (Electronic Industries Association (EIA) standard) is configured to add rare earth (RE) atoms (hereinafter, referred to as the RE atom), a transition element, and sintering aids to $BaTiO_3$ as a main component.

However, in the existing dielectric composition, since it is difficult to control a reaction and sintering property changed depending on a kind of RE atoms, it is not easy to implement reliability so as to satisfy specifications of a product at the time of changing the kind of RE atoms. In addition, in the existing dielectric composition, as the dielectric layer containing $BaTiO_3$ is thin, since it is difficult to control movement of oxygen vacancy causing deterioration of reliability, it is difficult to implement high permittivity.

RELATED ART DOCUMENT

Patent Document (Patent Document 1) US Patent No. 2012-0098386

SUMMARY OF THE INVENTION

An object of the present invention is to provide a dielectric ceramic composition capable of implementing high permittivity and reliability as compared with a dielectric ceramic composition according to the related art.

Another object of the present invention is to provide a multi-layer ceramic capacitor including a dielectric layer containing the dielectric ceramic composition.

According to an exemplary embodiment of the present invention, there is provided a dielectric ceramic composition containing a base material represented by $(Ba_{(1-x)}+RE_x)mTiO_{(3+x)}$ (here, $0.995 \leq m \leq 1.010$, $0.001 < x < 0.010$, and RE is at least one rare earth (RE) atom selected from a group consisting of Dy, Y, Ho, Sm, and Gd) or $Ba_m(Ti+RE_x)O_{(3-x)}$ (here, $0.995 \leq m \leq 1.010$, $0.001 < x < 0.010$, and RE is at least one RE atom selected from a group consisting of Dy, Y, Ho, Sm, and Gd) as a main component.

The dielectric ceramic composition may further contain sub-components including: at least one first sub-component selected from oxides of Mg, Ba, and Ca: a second sub-component containing Si oxide; a third sub-component containing metal oxides containing one or at least two selected from a group consisting of Cr, Mo, W, Mn, Fe, Co, Ni, and V.

The sub-component may further include a fourth sub-component containing Al oxide.

The sub-components may be contained so that a content of the first sub-component is 0.5 to 3.3 moles based on 100 moles of the main component, a content of the second sub-component is 50 to 125% based on the content of the first sub-component, and a content of the third sub-component configured of one or at least two metal oxides is 0.05 to 1.0 mole based on 100 moles of the main component.

A content of the fourth sub-component may be 0.5 moles or less based on 100 moles of the main component.

Each of the sub-components may have a specific surface area of $5.0 \, m^2/g$ at a timing point at which the sub-component is mixed with the main component.

The dielectric ceramic composition may satisfy X5R or X7R characteristics.

According to another exemplary embodiment of the present invention, there is provided a multi-layer ceramic capacitor including dielectric layers using the dielectric ceramic composition according to claim 1 and internal electrode layers that are alternately multi-layered therein.

The dielectric layer may contain grains having an average size of 0.75 μm or less after firing the dielectric ceramic composition.

The dielectric layer may have a thickness of 0.2 μm or more after firing.

The internal electrode layer may be made of a nickel or nickel alloy.

The dielectric ceramic composition may be sintered at 1230° C. or less under reduction atmosphere.

DESCRIPTION OF THE PREFERRED EMBODIMENTS

Hereinafter, the present invention will be described in more detail.

Terms used in the present specification are used in order to describe specific exemplary embodiments rather than limiting the present invention. Unless explicitly described to the contrary, a singular form includes a plural form in the present specification. Terms "comprise" and variations such as "comprise" and/or "comprising" used in the present specification will imply the existence of stated shapes, numbers, steps, operations, elements, and/or groups thereof, but does not include the exclusion of any other shapes, numbers, steps, operations, elements, and/or groups thereof.

The present invention relates to a dielectric ceramic composition satisfying X5R or X7R characteristics and a multilayer ceramic capacitor using the dielectric ceramic composition.

The dielectric ceramic composition according to the present invention contains a base material represented by $(Ba_{(1-x)}+RE_x)mTiO_{(3+x)}$ (here, $0.995 \leq m \leq 1.010$, $0.001 < x < 0.010$, and RE is at least one RE atom selected from a group consisting of Dy, Y, Ho, Sm, and Gd) or $Ba_m(Ti+RE_x)O_{(3-x)}$ (here, $0.995 \leq m \leq 1.010$, $0.001 < x < 0.010$, and RE is at least one RE atom selected from a group consisting of Dy, Y, Ho, Sm, and Gd) as a main component.

Particularly, the dielectric ceramic composition according to the present invention is characterized in that the RE atom is solid-solubilized in the base material. This is to solve problems in the existing dielectric composition that since it is difficult to control a reaction and sintering property changed depending on a kind of RE atoms, it is not easy to implement reliability so as to satisfy specifications of a product at the time of changing the kind of RE atoms, and as a dielectric layer containing $BaTiO_3$ is thin, since it is difficult to control movement of oxygen vacancy causing deterioration of reliability, it is difficult to implement high permittivity.

Therefore, in the present invention, the dielectric ceramic composition in which the RE atom is solid-solubilized in the base material is used, such that deterioration of physical properties due to change in the RE atom may be prevented.

In the present invention, "the RE atom is solid-solubilized in the dielectric base material" means that a degree of solid-solubilization of a RE metal in the dielectric base material is uniform.

Therefore, the m and x values in the main component base material are significantly important. When the m value is less than 0.995, the base material may be easily reduced at the time of firing under reduction atmosphere, to thereby be changed into a semiconducting material, and when the m value is more than 1.010, a firing temperature may be excessively increased.

In addition, since the permittivity and reliability may be controlled according to the x value, a product having the desired characteristics may be produced within the above-mentioned range of the x value. Therefore, when the x value is less than 0.001, the firing temperature may be increased, and the permittivity may be decreased, and when the x value is more than 0.010, a sintering temperature may be excessively increased, desired dielectric constant may be decreased, and it may be difficult to synthesize powder.

In addition, when a content of each sub-component contained in the dielectric ceramic composition according to the present invention is calculated as an atomic mole (in more detail, even though components of the composition are injected as oxides or ionic forms, a content of an additive means an atomic mol % of each element. For example, even though Y oxide ($Y_2O_3$) is injected as an additive, a content amount of the additive is calculated as a mole of $Y^{+3}$) of the exemplary sub-component, a content of a first sub-component is 0.5 to 3.3 moles based on 100 moles of the main component, a content of a second sub-component is 50 to 125% based on the content of the first sub-component, and a content of a third sub-component configured of one or at least two metal oxide is 0.05 to 1 mole based on 100 moles of the main component. Aluminum oxide is not necessarily required, but in the case in which the aluminum oxide is added at a content of 0 to 0.5 moles, the firing temperature may be decreased.

As the first sub-component according to the present invention, oxides of Mg, Ba, and Ca may be used. A specific example includes MgO, $MgCO_3$, BaO, CaO, $BaCO_3$, $CaCO_3$, or the like, but is not limited thereto. The first sub-component is contained at a content of 0.5 to 3.3 moles based on 100 moles of the main component. In the case in which the content is less than 0.5 moles, the reliability may be deteriorated, and in the case in which the content is more than 3.3 moles, the firing temperature may be increased, and the permittivity may be decreased.

Further, as the second sub-component according to the present invention, Si oxide (for example, $SiO_2$) may be preferably used. The content of the second sub-component is preferably 50 to 125% based on the content of the first sub-component. In the case in which the content of the second sub-component is less than 50% based on the content of the first sub-component, the permittivity may be decreased, and it may be difficult to find an appropriate firing temperature, and in the case in which the content is more than 125%, the reliability may be deteriorated, and temperature coefficient of capacitance (TCC) characteristics may be unstable.

In addition, as the third sub-component according to the present invention, metal oxides of one or at least two selected from a group consisting of Cr, Mo, W, Mn, Fe, Co, Ni, and V may be preferably used. In the third sub-component, the sum of the contents of one or at least two kinds may be 0.05 to 1 mole. In the case in which the sum is less than 0.05 moles, high temperature accelerated life may be decreased, and TCC (temperature coefficient of dielectric constant) may be unstable, and in the case in which the sum is more than 1.0 mole, the sintering temperature may be decreased but the desired dielectric constant value may not be obtained, and aging characteristics may be deteriorated.

Further, the dielectric ceramic composition according to the present invention may selectively contain aluminum oxide (for example, $Al_2O_3$) as a fourth sub-component. As the dielectric ceramic composition contains the fourth sub-component, there are advantages in that the firing temperature may be decreased, and a firing window may be widened. However, a content of the fourth sub-component is more than 0.5 moles, it is difficult to control grain growth, and the desired dielectric constant value may not be obtained.

In addition, although an initial specific surface area of each sub-component is not important, the specific surface area of each sub-component at a timing point at which the sub-component is finally mixed with the main component may be preferably 5.0 $m^2$/g or more. The reason is that dispersibility may be improved by increasing the specific surface area of the sub-component, which improves characteristics and reliability of the product.

Further, when a fine structure of a sample fired using the dielectric ceramic composition according to the present invention is observed, an average grain size may be 0.75 µm or less. In the case in which the average grain size of the fired sample is more than 0.75 µm, problems such as dissipation factor (DF) spec out due to grain growth, deterioration of reliability may be generated.

In the case of using the dielectric ceramic composition according to the present invention in a multi-layer ceramic capacitor (MLCC), high permittivity and high temperature reliability may be secured by adding the base material in which the RE atom is solid-solubilized and the oxide, which is the sub-component, and an internal electrode made of Ni and an Ni alloy may be used.

Particularly, the dielectric ceramic composition according to the present invention may be used in a multi-layer dielectric product and a product in which internal electrode layers, for example, Ni or Ni alloy internal electrode layers and dielectric layers are alternately multi-layered. In this case, the dielectric ceramic composition may be used in the dielectric layer having a thickness of 0.2 µm or more after firing. In the dielectric layer having an excessively thin thickness, the number of grains present in a single layer is small, which has a negative influence on reliability. Therefore, it is recommended that the dielectric ceramic composition is used in the active layer having a thickness of 0.2 µm or more.

The MLCC may be fired at a temperature of 1230° C. or less under reduction atmosphere, and a high permittivity multi-layer ceramic capacitor having a dielectric constant of 1800 may be manufactured.

However, the dielectric ceramic composition according to the present invention is not limited to being used in the MLCC but may be used in all of the dielectric products. For example, the dielectric ceramic composition may be used in a piezoelectric element, a chip inductor, a chip varistor, a chip resistor, and the like.

Hereinafter, Examples of the present invention will be described. The following Example is only to exemplify the present invention, and the scope of the present invention should not be interpreted to being limited to these Examples. Further, although the following Examples exemplify the present invention using specific compounds, it is obvious to those skilled in the art that the same or similar effect may also be generated in the case of using equivalents to the specific compounds.

EXAMPLE

After raw materials having the compositions and the contents shown in the following Table 1 were mixed with a dispersing agent using ethanol and toluene as solvents, a binder was mixed with the mixture, thereby forming a ceramic sheet. After a chip obtained by printing a Ni electrode on the formed ceramic sheet, multi-layering the ceramic sheets including the Ni electrode printed thereon, compressing the multi-layered sheets, and then cutting the compressed sheet was calcined in order to remove the binder, firing was performed at 1100 to 1300° C. Then, a TCC value, a dielectric constant value, high temperature accelerated life, and the like, were measured, and the results were shown in the following Table 1.

Describing in more detail, raw material powder was mixed with ethanol/toluene, the dispersing agent, and the binder using a zirconia ball as mixing/dispersing media and then ball-milled for 24 hours, thereby preparing slurry. In the case of the sub-components of the following Table 1, each of the sub-components had a specific surface area of 5.0 m$^2$/g or more at a timing point at which the sub-component was mixed with a main component base material.

The prepared slurry was formed into a sheet having a thickness of 2.0 to 10 µm using a coater in a small doctor blade scheme. Thereafter, the Ni internal electrode was printed on the dielectric sheet. As upper and lower covers, 35 covering sheets (thickness≤10 µm) were multi-layered (35 layers), and a bar was manufactured by multi-layering 20 printed active sheets while compressing the printed active sheets. A compressed bar was cut into chips having a size of 3216 standard using a cutter. After the manufactured 3216 chip was calcined and then fired at a temperature of 1100 to 1300° C. under reduction atmosphere for 90 minutes, the fired chip was heat-treated at 1060° C. for 2 hours for re-oxidation. The fired chip was subjected to a termination process and then released for 2 hours, followed by measurement.

Room temperature capacitance and a dielectric loss were measured at 1 kHz and 1V using a LCR meter, and temperature coefficient of capacitance (TCC) was measured in a temperature range from –55 to 125° C. A high temperature insulation resistance (IR) test was performed while increasing pressure at 150° C. (here, 1 Vr=10 v/µm), thereby evaluating high temperature reliability.

The high temperature accelerated life means a voltage at which an IR may withstand 10$^5$ Ω or more when a 3216 chip including an active layer configured of 20 layers having a thickness of 2.5 to 4.0 µm after firing was manufactured and then a DC voltage of 10V/µm (1 Vr=10 v/µm) is applied to the 3216 chip at 150° C.

The TCC value at 125 was measured using the 3216 chip similarly to the high temperature accelerated life.

TABLE 1

| Sample No. | Grain size (nm) | $Ba_m(Ti + RE_x)O_{(3-x)}$ base material m value | Amount of completely solid-solubilized RE atom in base material (x value) | First sub-component | Second sub-component | Third sub-component | Fourth sub-component ($Al_2O_3$) | Dielectric constant | 125° C. TCC [%] | High temperature accelerated life (Vr) | Sintering temperature [° C.] |
|---|---|---|---|---|---|---|---|---|---|---|---|
| Spec. | Min | 0.995 | 0.001 | 0.5 | 50% | 0.05 | 0 | 1500 | −15 | 4 | 1240 |
|  | Max | 1.010 | 0.01 | 3.3 | 150% | 1 | 0.5 |  | 15 |  |  |
| 1 | 300 | 1.002 | Ho 0.002 | Mg 0.4 Ba 1.0 Ca 0.96 | Si 95% | Mn 0.25 V 0.1 | 0 | 4500 | −27 | 4 | 1220 |

TABLE 1-continued

| Sample No. | Grain size (nm) | $Ba_m(Ti + RE_x)O_{(3-x)}$ base material m value | Amount of completely solid-solubilized RE atom in base material (x value) | First sub-component | Content (mole) of sub-component based on 100 moles of base material Second sub-component | Third sub-component | Fourth sub-component ($Al_2O_3$) | Dielectric constant | 125° C. TCC [%] | High temperature accelerated life (Vr) | Sintering temperature [° C.] |
|---|---|---|---|---|---|---|---|---|---|---|---|
| 2 | 320 | 1.000 | Y 0.002 | Mg 0.65 Ba 1.0 Ca 0.96 | Si 86% | Mn 0.25 V 0.1 | 0 | 4100 | −24 | 4 | 1230 |
| 3 | 280 | 0.995 | Dy 0.004 Y 0.005 Ho 0.005 | Mg 0.8 Ba 1.5 Ca 1.0 | Si 110% | Mn 0.25 V 0.1 | 0 | 3400 | −20 | 4 | 1220 |
| 4 | 340 | 0.997 | | Mg 0.4 Ba 0.95 Ca 0.96 | Si 50% | Mn 0.1 Cr 0.1 V 0.1 | 0 | 3300 | −15 | 5 | 1220 |
| 5* | 310 | 1.000 | Y 0.004 | Mg 0.85 Ba 2.35 Ca 0.35 | Si 70% | Mn 0.2 V 0.1 | 0.22 | 2600 | −15 | 3 | 1240 |
| 7 | 250 | 1.000 | Ho 0.005 | Mg 0.4 Ba 0.8 Ca 1.15 | Si 78% | Mn 0.3 V 0.1 | 0.22 | 2800 | −19 | 4 | 1190 |
| 8 | 430 | 1.003 | Dy 0.007 | Mg 0.3 Ba 1.0 Ca 0.90 | Si 100% | Mn 0.2 Cr 0.1 | 0.22 | 3400 | −27 | 4 | 1230 |
| 9 | 180 | 1.006 | Y 0.007 | Mg 0.2 Ba 0.7 Ca 0.84 | Si 125% | Mn 0.25 V 0.1 | 0.22 | 2800 | −20 | 4 | 1180 |
| 10* | 300 | 1.000 | Y 0.012 Dy 0.010 | Mg 1.0 Ba 1.4 Ca 0.0 | Si 45% | Mn 0.1 V 0.1 | 0.12 | 2300 | −10 | 3 | 1250 |
| 11 | 150 | 1.010 | Y 0.007 Dy 0.007 | Mg 0.1 Ba 0.8 Ca 0.2 | Si 83% | Mn 0.2 V 0.1 | 0.5 | 3000 | −12 | 4 | 1170 |
| 12* | 150 | 0.990 | Dy 0.005 | Mg 0.3 Ba 0.4 Ca 0.1 | Si 150% | Mn 0.2 V 0.1 | 0.5 | 3500 | −28 | 1 | 1170 |
| 13* | 150 | 1.014 | Dy 0.005 | Mg 0.4 Ba 0.3 Ca 1.5 | Si 83% | Mn 0.2 V 0.1 | 0.5 | 2200 | −10 | 3 | 1280 |

※The dielectric constant is rounded on the tens place.
*indicates a sample that is out of the range of the present invention.

As shown in Table 1, it was confirmed that in the case in which the dielectric ceramic composition using the dielectric base material in which the RE metal is solid-solubilized at a predetermined content was contained in the dielectric layer, the dielectric constant was high, the high temperature accelerated life characteristics and high temperature reliability were excellent, and the sintering temperature may be effectively decreased.

In the dielectric ceramic composition according to the present invention, high permittivity (dielectric constant of 1800 or more) and high temperature reliability may be secured by using the RE atom doped/solid-solubilized base material and adding oxides, which are sub-components.

In addition, the dielectric ceramic composition is applied to the multi-layer ceramic capacitor (MLCC), or the like, such that nickel or alloy thereof may be used as the internal electrode, and firing may be performed at 1230° C. or less under reduction atmosphere.

What is claimed is:

1. A dielectric ceramic composition comprising a base material represented by
$(Ba_{(1-x)}+RE_x)mTiO_{(3+x)}$ (here, $0.995 \leq m \leq 1.010$, $0.001 < x < 0.010$, and RE is at least one rare earth (RE) atom selected from a group consisting of Dy, Y, Ho, Sm, and Gd) or
$Ba_m(Ti+RE_x)O_{(3-x)}$ (here, $0.995 \leq m \leq 1.010$, $0.001 < x < 0.010$, and RE is at least one RE atom selected from a group consisting of Dy, Y, Ho, Sm, and Gd) as a main component.

2. The dielectric ceramic composition according to claim 1, further comprising sub-components including:
at least one first sub-component selected from oxides of Mg, Ba, and Ca:
a second sub-component containing Si oxide; and
a third sub-component containing metal oxides containing one or at least two selected from a group consisting of Cr, Mo, W, Mn, Fe, Co, Ni, and V.

3. The dielectric ceramic composition according to claim 2, wherein the sub-component further includes a fourth sub-component containing Al oxide.

4. The dielectric ceramic composition according to claim 2, wherein the sub-components are contained so that a content of the first sub-component is 0.5 to 3.3 moles based on 100 moles of the main component, a content of the second sub-component is 50 to 125% based on the content of the first sub-component, and a content of the third sub-component configured of one or at least two metal oxides is 0.05 to 1.0 mole based on 100 moles of the main component.

5. The dielectric ceramic composition according to claim 3, wherein a content of the fourth sub-component is 0.5 moles or less based on 100 moles of the main component.

6. The dielectric ceramic composition according to claim 2, wherein each of the sub-components has a specific surface area of 5.0 m$^2$/g at a timing point at which the sub-component is mixed with the main component.

7. The dielectric ceramic composition according to claim 1, wherein it satisfies X5R or X7R characteristics.

8. A multi-layer ceramic capacitor comprising dielectric layers using the dielectric ceramic composition according to claim 1 and internal electrode layers that are alternately multi-layered therein.

9. The multi-layer ceramic capacitor according to claim 8, wherein the dielectric layer contains grains having an average size of 0.75 μm or less after firing the dielectric ceramic composition.

10. The multi-layer ceramic capacitor according to claim 8, wherein the dielectric layer has a thickness of 0.2 μm or more after firing.

11. The multi-layer ceramic capacitor according to claim 8, wherein the internal electrode layer is made of a nickel or nickel alloy.

12. The multi-layer ceramic capacitor according to claim 8, wherein the dielectric ceramic composition is sintered at 1230° C. or less under reduction atmosphere.

* * * * *